United States Patent
Nicholson

(10) Patent No.: US 12,317,010 B2
(45) Date of Patent: May 27, 2025

(54) SCANNING PROJECTOR DYNAMIC RESOLUTION

(71) Applicant: GOOGLE LLC, Mountain View, CA (US)

(72) Inventor: Stuart James Myron Nicholson, Waterloo (CA)

(73) Assignee: GOOGLE, Mountain View, CA (US)

( * ) Notice: Subject to any disclaimer, the term of this patent is extended or adjusted under 35 U.S.C. 154(b) by 104 days.

(21) Appl. No.: 18/035,284

(22) PCT Filed: Dec. 30, 2020

(86) PCT No.: PCT/US2020/067512
§ 371 (c)(1),
(2) Date: May 3, 2023

(87) PCT Pub. No.: WO2022/146431
PCT Pub. Date: Jul. 7, 2022

(65) Prior Publication Data
US 2023/0421736 A1    Dec. 28, 2023

(51) Int. Cl.
*H04N 9/31*   (2006.01)
*G02B 27/01*  (2006.01)

(52) U.S. Cl.
CPC ....... *H04N 9/3188* (2013.01); *G02B 27/0172* (2013.01); *H04N 9/3135* (2013.01);
(Continued)

(58) Field of Classification Search
CPC .... H04N 9/3188; H04N 9/315; H04N 9/3135; H04N 9/3173; G02B 27/0172;
(Continued)

(56) References Cited

U.S. PATENT DOCUMENTS

2010/0315595 A1   12/2010   Marcus et al.
2013/0257691 A1*  10/2013   Saito .............. G02B 27/017
                                                        345/8
(Continued)

FOREIGN PATENT DOCUMENTS

CN        109581654 A     4/2019

OTHER PUBLICATIONS

International Search Report and Written Opinion mailed Sep. 9, 2021 for corresponding International Application No. PCT/US2020/067512, 15 pages.
(Continued)

*Primary Examiner* — Muhammad N Edun

(57) ABSTRACT

Systems, devices, and techniques are provided for reducing graphical bandwidth in a projection display system by modifying a modulation frequency used to display one or more portions of content based on an identified content type of such portions. Content is received for display, and types of content associated with one or more portions of the received content are identified. For each respective portion of content, an effective resolution is selected for displaying the respective portion based on the identified content type for the respective portion, and one or more light beams directed to a respective display area of a projection surface are modulated at a respective emitter modulation frequency that corresponds to the selected effective resolution for the respective portion.

21 Claims, 7 Drawing Sheets

(52) U.S. Cl.
CPC ..... *H04N 9/315* (2013.01); *G02B 2027/0147* (2013.01); *G02B 2027/0178* (2013.01)

(58) Field of Classification Search
CPC .......... G02B 2027/0178; G02B 27/017; G02B 2027/0147
See application file for complete search history.

(56) References Cited

U.S. PATENT DOCUMENTS

| | | |
|---|---|---|
| 2014/0267420 A1* | 9/2014 | Schowengerdt ...... G06T 19/006 345/633 |
| 2016/0239190 A1 | 8/2016 | Forutanpour et al. |
| 2018/0203340 A1 | 7/2018 | Wang et al. |
| 2019/0287495 A1 | 9/2019 | Mathur et al. |

OTHER PUBLICATIONS

International Preliminary Report on Patentability mailed Jul. 13, 2023 for PCT Application No. PCT/US2020/067512, 9 pages.

* cited by examiner

FIG. 3

SCANNING PROJECTOR DYNAMIC RESOLUTION

CROSS-REFERENCE TO RELATED APPLICATIONS

The present application is a U.S. National Stage under 35 U.S.C. § 371 of International Patent Application Serial No. PCT/US2020/067512, entitled "SCANNING PROJECTOR DYNAMIC RESOLUTION" and filed on Dec. 30, 2020, the entirety of which is incorporated by reference herein.

BACKGROUND

Wearable devices typically have limited energy available for operation. It is therefore advantageous for displays in such devices to consume minimal power. However, each additional pixel in a graphics pipeline is more data that needs to be computed, transmitted, processed and displayed, increasing the energy load of a system. Reducing the number of pixels to be processed as part of displaying content on wearable device displays can reduce graphics processing power consumption while maintaining optimal image quality.

SUMMARY

In embodiments described herein, a quantity of pixels being displayed (and a corresponding amount of power being expended) is reduced while maintaining low user cognitive load and high perceived image quality by modifying an effective resolution for a projection display system in accordance with a type of content being displayed by selecting a modulation frequency for one or more light emitters in the projection display system.

In one example embodiment, a method for displaying an image may include receiving a first portion of content for display; identifying a type of content associated with the first portion; selecting, based at least in part on the identified type of content, a first emitter modulation frequency; and rendering pixels of the first portion of content at a first effective resolution by modulating one or more light beams directed to a first display area of a projection surface at the first emitter modulation frequency.

According to further examples, the method may comprise one or more (e.g., all) of the following features (or any combination thereof).

Modulating the one or more light beams at the first emitter modulation frequency may include modifying an intensity of at least one of the one or more light beams at the first emitter modulation frequency.

The method may further comprise rendering pixels of a distinct second portion of content by modulating the one or more light beams at a distinct second emitter modulation frequency while the one or more light beams are directed to a second display area of the projection surface.

Also, the method may further comprise:
 receiving the second portion of content for display;
 evaluating the second portion to determine a distinct second type of content associated with the second portion; and
 selecting, based at least in part on the second type of content, the distinct second emitter modulation frequency.

Also, the method may further comprise storing multiple defined display area configurations, each of the defined display area configurations indicating one or more display areas of the projection surface that are each associated with one or more of an effective resolution and a specified modulation frequency.

Further, identifying the type of content associated with the first portion includes selecting one of the multiple defined display area configurations.

Also, identifying the type of content associated with the first portion may include identifying the type of content based on one or more graphical characteristics of the first portion.

The one or more graphical characteristics of the first portion may include one or more of a contrast ratio of the first portion and a color depth of the first portion.

Also, the projection surface may be part of an optical element that includes at least a portion of one or more eyeglass lenses.

In another example embodiment, a display system may comprise an interface to receive content for display by the display system; a processor to identify one or more types of content associated with one or more portions of content in the received content, and to select, for each respective portion of the one or more portions of content and based at least in part on the identified content type for the respective portion, an effective resolution for displaying the respective portion; and a modulation controller to modulate, for each respective portion of the one or more portions of content, one or more light beams directed to a respective display area of a projection surface at a respective emitter modulation frequency that corresponds to the selected effective resolution for the respective portion.

According to further examples, the display system may comprise one or more (e.g., all) of the following features (or any combination thereof). The display system and/or the components comprised within the display system may be adapted to perform the following features.

To modulate the one or more light beams may include to modify an intensity of at least one of the one or more light beams at the respective emitter modulation frequency.

To identify the one or more types of content may include to identify one of multiple stored display area configurations associated with the received content, each of the stored display area configurations indicating one or more display areas of the projection surface that are each associated with one or more of an effective resolution and a specified modulation frequency.

Also, to identify the one or more types of content may include to identify that a first respective portion of content includes textual content and to identify that a second respective portion of content includes graphical content, and wherein to select an effective resolution for displaying the first respective portion of content includes to select a first respective effective resolution that is less than a second respective effective resolution for the second respective portion of content.

Also, to identify the type of content associated with at least one portion of the one or more portions of content, may include to identify the type of content based on one or more graphical characteristics of the at least one portion.

Also, to identify the type of content associated with at least one portion of the one or more portions of content may include to identify the type of content based on metadata included in the received content.

The projection surface may be part of an optical element that includes at least a portion of one or more eyeglass lenses. In another example embodiment, a head wearable display (HWD) device may comprise an optical element; a processor to identify one or more types of content associated with one or more portions of content for display, and to select, for each respective portion of the one or more portions of content and based at least in part on the identified content type for the respective portion, an effective resolution for displaying the respective portion; at least one light emitter to emit one or more light beams; a scanning redirector to redirect the one or more emitted light beams to one or more display regions on a projection surface of the optical element; and a modulation controller to modulate, for each respective portion of the one or more portions of content, one or more light beams directed to a respective display area of a projection surface at a respective emitter modulation frequency that corresponds to the selected effective resolution for the respective portion.

According to further examples, the head wearable display device may comprise one or more (e.g., all) of the following features (or any combination thereof). The head wearable display device and/or the components comprised within the head wearable display device may be adapted to perform the following features.

To modulate the one or more light beams might include to modify an intensity of at least one of the one or more light beams at the respective emitter modulation frequency.

To identify the one or more types of content may include to identify one of multiple stored display area configurations associated with the received content, each of the stored display area configurations indicating one or more display areas of the projection surface that are each associated with one or more of an effective resolution and a specified modulation frequency.

To identify the one or more types of content may include to identify that a first respective portion of content includes textual content and to identify that a second respective portion of content includes graphical content, and wherein to select an effective resolution for displaying the first respective portion of content includes to select a first respective effective resolution that is less than a second respective effective resolution for the second respective portion of content.

To identify the type of content associated with at least one portion of the one or more portions of content may include to identify the type of content based on one or more graphical characteristics of the at least one portion.

To identify the type of content associated with at least one portion of the one or more portions of content may include to identify the type of content based on metadata included in the received content.

The optical element may comprise at least a portion of one or more eyeglass lenses.

In another example embodiment, a computer program product may have instructions stored thereon, the instructions, when executed by a processor, may cause the processor to perform the steps of a method as described herein.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 3 depicts alternative arrangements for scanning a simplified pixel matrix in accordance with one or more embodiments.

DETAILED DESCRIPTION

Figure 1:
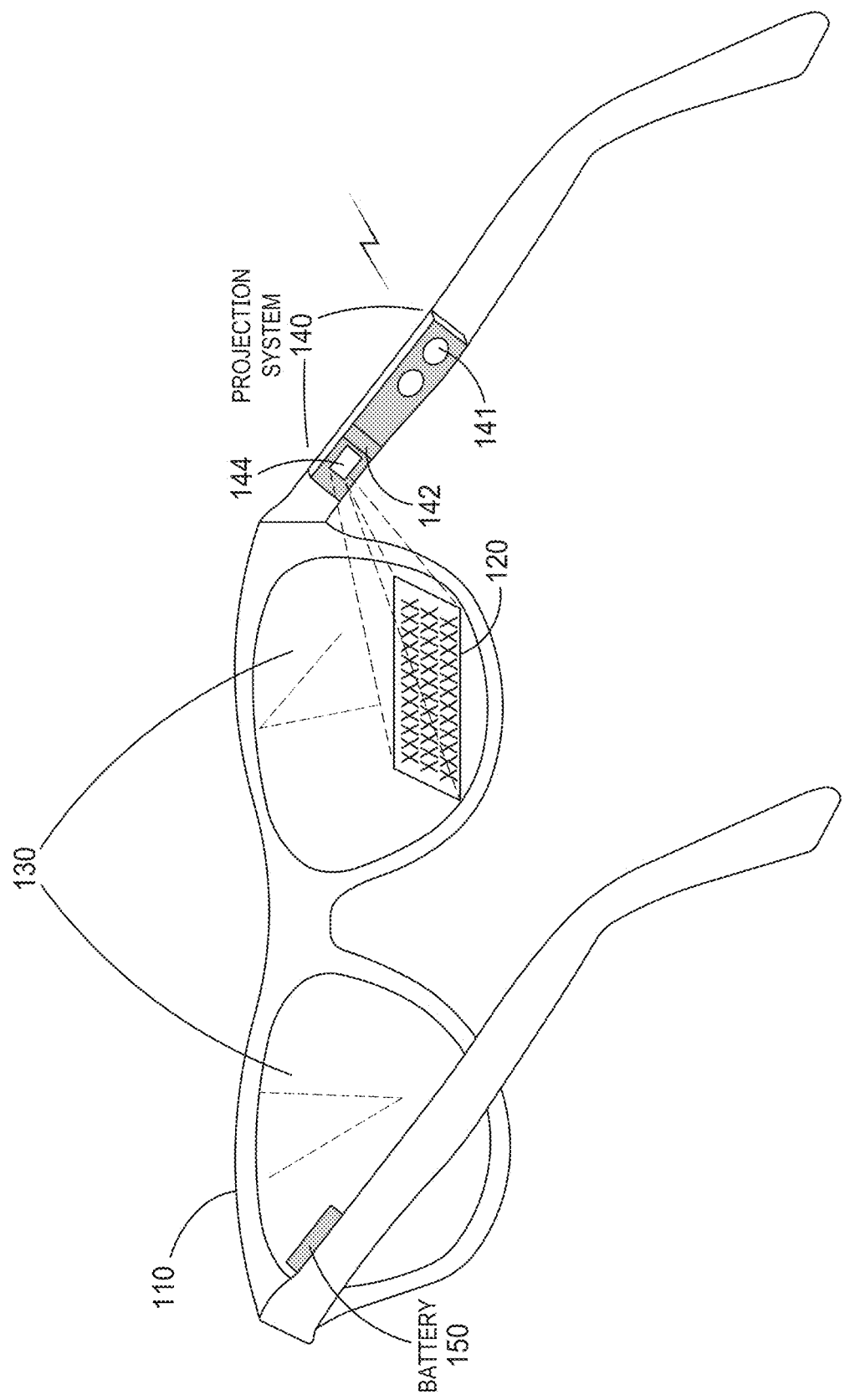
FIG. 1 is a partial-cutaway perspective view of an example wearable heads-up display suitable for implementing one or more embodiments.

In projection display systems (such as scanning projector systems) that display pixel matrices by redirecting one or more emitted beams of light via dynamic mirror(s) or to other redirection system, the display resolution provided by such systems is dependent on two major parameters: mirror speed and emitter modulation frequency. The mirror speed is effectively periodic, with a period that is governed by physical parameters such as the mirror's resonance frequency or inertia. This periodic mirror speed may be modified with significant energy investment, such as to maintain a constant or near-constant mirror speed, but such energy investment is antithetical to the goal and advantages of reduced power consumption in mobile or wearable devices.

When processing textual content, a user's cognitive load may be lessened by maintaining sufficient contrast in the displayed content; in general, the higher the contrast, the easier it is for a user to discern where a textual character is and where it is not, and therefore the lower the associated cognitive load. In contrast, when processing graphical content, higher levels of contrast are associated with lower perceived image quality, and with greater cognitive load.

In embodiments described herein, in order to reduce a quantity of pixels being displayed (and a corresponding amount of power being expended) while maintaining low user cognitive load and high perceived image quality, an effective resolution for a projection display system is modified in accordance with a type of content being displayed. Content such as text, in which user cognitive load is reduced by maintaining sufficiently high contrast, may be displayed via a reduced sampling rate of the relevant graphics texture. Thus, embodiments of systems, devices, and techniques described herein provide a significant reduction in a quantity of pixels to be displayed via a graphics pipeline by modifying a modulation frequency of one or more light emitters in a projection display system in order to dynamically modify an effective display resolution based on the content being displayed. In short, embodiments described herein vary an emitter modulation frequency in a projection display system based on a type of content being displayed.

For example, in an embodiment, in order to increase an effective display resolution for graphical content (e.g., photographic or video content), a modulation frequency of the one or more light emitters is maintained or increased, thereby maintaining or reducing a width of the associated pixels being projected and maintaining or increasing the quantity of those pixels that are used for displaying each scan line. In contrast, textual content (including, in certain embodiments, content associated with user interface elements) may be displayed with reduced effective resolution by decreasing a modulation frequency of the one or more light emitters, thereby increasing the corresponding width of the pixels being projected and decreasing the quantity of those pixels that are used for displaying each scan line.

In various embodiments, one or more types of content may be identified and associated with distinct target effective resolutions (and corresponding modulation frequencies) in various manners. As one example, a scanning projector controller may receive data and/or metadata from an image generator (e.g., a graphics processor or "GPU") identifying a type of content occupying one or more portions of content received from the image generator. As another example, the scanning projector controller may directly analyze one or more portions of the received content, such as by identifying a type of content based on a color depth, contrast ratio, or other graphical characteristic(s). In certain embodiments a decreased effective resolution of a projected image may be associated with additional benefits with respect to a GPU tasked with generating pixel information for the projection system. For example, for image portions determined to require only low effective resolution, the computational and power benefits of that low effective resolution may be shared by the GPU, which may render the image (or portions thereof) at this low resolution, reducing the cost of rendering and transferring data by the graphics processing unit, as well as the corresponding costs for the scanning projector controller.

In certain embodiments, a system employing techniques described herein may distinguish between portions of a pixel matrix used to display different types of content. For example, the system may determine that a first portion of a display area contains photographic or other graphical content, and may consequently determine to maintain or increase a modulation frequency used to project pixels displayed in the first portion of the display area. The system may also determine that a distinct second portion of the display area contains textual content, and may consequently determine to decrease a modulation frequency used to project pixels displayed in that second portion of the display area. Moreover, in certain embodiments, the system may determine to modify a modulation frequency (and corresponding effective resolution) to display content identified as having one or more intermediate types of content, such as content that includes text and non-photographic image content that supports a lower effective resolution while maintaining a low cognitive load for the user.

In an embodiment, a system may store one or more predefined display area configurations that may be used based on an identification of particular content, with each of the predefined display area configurations being associated with one or more display areas that are each associated with a distinct effective resolution (and corresponding modulation frequency). For example, a first display area configuration may correspond to received content identified as a webpage, such as if received content primarily includes textual content with one or more areas of photographic or other image content positioned adjacent to the text. A second display area configuration may correspond to a map display, such as if incoming content is identified as having textual elements overlaid on graphical but non-photographic content. It will be appreciated that any quantity or variety of such predefined display area configurations may be stored and selected for use based on a type (or multiple types) of received content identified by the system.

FIG. 1 illustrates a head worn display (HWD) device 110 in the form of smart glasses that, according to an embodiment, are not much bigger or heavier than a regular pair of eyeglasses. In the depicted embodiment, the HWD device 110 includes an optical element 130 (which may comprise one, or multiple, prescription eyeglass lenses or non-prescription lenses), a projection system 140, and a battery 150.

The projection system 140 may, in at least one embodiment, comprise a MEMS-based projection system, and may communicate wirelessly or in some other manner to a server or mobile device to receive graphical, textual, or other content for display via a projection surface display area 120 of the optical element(s) 130. In the depicted embodiment, the projection system 140 includes a light-emitting scanning laser projector (SLP) 144 and a scan mirror 142, which may comprise, as non-limiting examples, a single two-dimensional scan mirror or two one-dimensional scan mirrors (such as MEMS-based or piezo-based scan mirrors). The projection system 140 displays content on the optical element 130 by projecting one or more beams of light emitted by the SLP 144 towards the scan mirror 142 for redirection at an angle appropriate to display the content via the display area 120 on a projection surface of the optical element. In the example shown, a user views real world images through the transparent lenses 130, and may view projected content via display area 120. The projection system 140 may be coupled to physical controls 141, for instance for power or other controls.

In certain embodiments, the projection system 140 may be coupled to a gaze tracker. The gaze tracker differs from the projection system 140 because it is effectively a camera system aimed at the user's eye rather than the lens to determine at what angle the user's gaze is directed. The gaze tracker may be integrated with the projector system 140 using a non-visible laser to the projection system that shines light onto the eye and the reflected light, reflected by the eye, reaches a photosensor, such as a photodiode, placed as well in the projection system. In another embodiment, the gaze tracker may be separate from the projector system 140, but in communication with components on the smart glasses 110. The gaze tracker may use a frame of reference angle based on the mounting configuration on the smart glasses 110.

In an embodiment, SLP 144 may include multiple laser diodes (e.g., a red laser diode, a green laser diode, and/or a blue laser diode). The SLP 120 may be communicatively coupled to (and support structure 110 may further carry) a processor and a non-transitory processor-readable storage medium or memory storing processor-executable data and/or instructions that, when executed by the processor, cause the processor to control the operation of the SLP 120. For ease of illustration, FIG. 1 does not depict a processor or a memory.

In various embodiments, the battery 150 may be replaceable or rechargeable via wired or wireless means. The battery 150 may provide power to the projection system 140 via wires embedded in the plastic frame, and therefore unseen.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, and/or supported by, with or without any number of intermediary physical objects therebetween.

Figure 2:
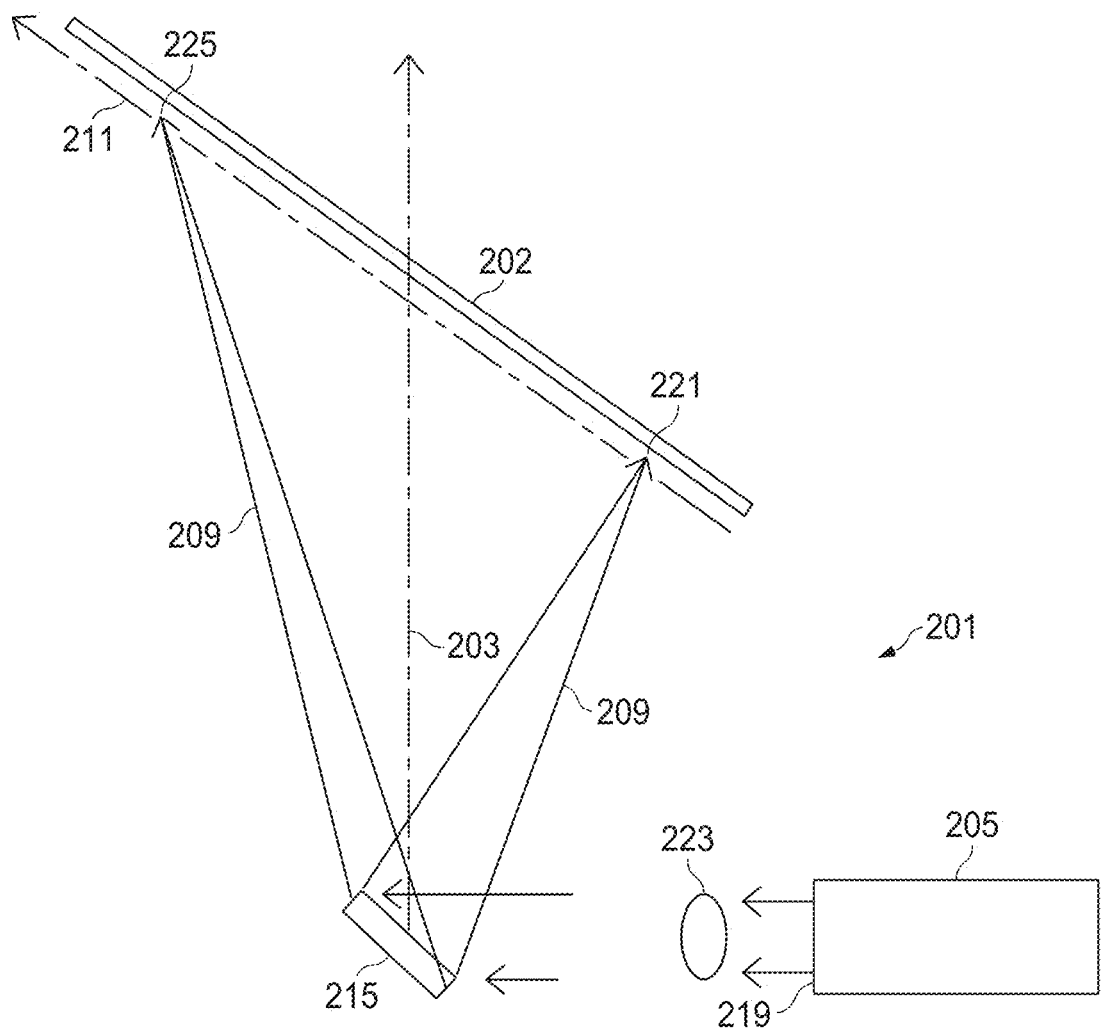
FIG. 2 is a block diagram of an optical system in accordance with one or more embodiments.

FIG. 2 is a block diagram illustrating an on-axis view of a projection system 201 in accordance with one or more embodiments of the present disclosure. In general, the projection system 201 may display graphical content via a projection surface 202 by emitting one or more light beams that are each associated with a respective intensity level, allowing such respective intensity levels to be locally controlled. The projection system 201 may therefore be used, for example, to display individual pixels of an image in each of multiple locations on that projection surface 202.

The projection system 201 projects an image onto projection surface 202, which depicted as being strongly non-perpendicular to a chief ray 203 (e.g., meridional ray, or the like) of the projection system 201. In various embodiments, the surface 202 may be reflective, such that an image may be projected on the retina of a viewers eye so that the viewer can perceive the projected image as a real or virtual image.

The term "projection surface" is used in this text to refer to any physical surface towards which light emitted from a light source is projected, and from which the light travels onward to a viewpoint, thereby rendering a projected image visible. For example, the surface may be at least part of a transparent or partially transparent body such as an eyeglass lens, vehicle or other window, or other suitable optical element. It will be appreciated that the term is not used in a narrow sense or to be limited to a physical surface on to which light is projected in order to render visible graphical or other content.

The projection system 201 comprises a light emitter 205 configured to emit a light beam 209, which is scanned across the projection surface 202 via a scanning redirection system 215 to project an image onto the surface 202. In particular, the light emitter 205 emits light from a light source emission surface 219. In the depicted embodiment, the light is transmitted through a lens 223, such as a variable position lens (also called a dynamic lens or a movable lens). The lens 223 can be located between the light emitter 205 and the scanning redirection system 215. In the depicted embodiment, the lens 223 is a variable position lens that can be adjusted to focus the light emitted by the light emitter 205. The light is transmitted through the lens 223 and is incident on the scanning redirection system 215. In some examples, the scanning redirection system 215 can comprise one or more MEMS scanning mirrors. In certain embodiments, some portion or all of the scanning redirection system 215 rotates to scan the light beam 209 across the projection surface 202 in the direction of axis 211 and/or another axis orthogonal to axis 211 across the projection surface, to project an image onto the projection surface.

In general, the lens 223 is to focus the light beam 209 at a virtual focal surface or at the projection surface 202, thereby creating a pixel at point 221 and/or point 225. During the image generation process the scanning redirection system 215 scans the light beam 209 along a scan path that includes multiple locations on the projection surface 202 to project an entire image on the projection surface 202 (e.g., between points 221 and 225, or the like). As can be seen, the distance between point 221 and the scanning redirection system 215 is different from the distance between point 225 and the scanning redirection system 215. This is because the projection surface 202 is substantially non-orthogonal to the chief ray 203. In certain embodiments, the projection system 201 may include one or more additional components that are omitted here for expediency and/or clarity. For example, the projection system may include a waveguide, such as to transfer the light beam 209 from the projector 205 to an eye of the user via the lens 223.

In various embodiments, the light emitter 205 may comprise one or more instances of (as non-limiting examples) a laser, a superluminescent diode (SLED), a microLED, a resonant-cavity light emitting diode (RCLED), a vertical-cavity surface-emitting laser (VCSEL) light source, or the like. The light emitter 205 may comprise a single light source or multiple light sources. In certain embodiments, such as embodiments in which multiple light sources are utilized, optical coupling devices (e.g., a beam combiner and/or dichroic plates) may also be utilized.

In at least one embodiment, the scanning redirection system 215 comprises a movable plate and a mirror arranged to be rotated about two mutually orthogonal axes. In certain embodiments, the mirror may rotate about one axis. In other embodiments, the scanning redirection system 215 may comprise two mirrors, such that each mirror rotates about one axis. In particular, each mirror may rotate about mutually orthogonal axes.

In general, the displacement of the lens 223 with respect to the scanning redirection system 215 may be changed dynamically during operation. In some examples, the lens 223 may comprise an electro-active polymer. As such, applying electric current to the lens 223 may physically deform the lens 223 and consequently the displacement of the lens 223 can be varied. In some examples, the lens 223 may be a piezo-actuated rigid or polymer lens, in which the lens is actuated with a driving signal to cause the lens to physically move to a different location. In some examples, the driving signal may be provided by a controller.

Figure 3:
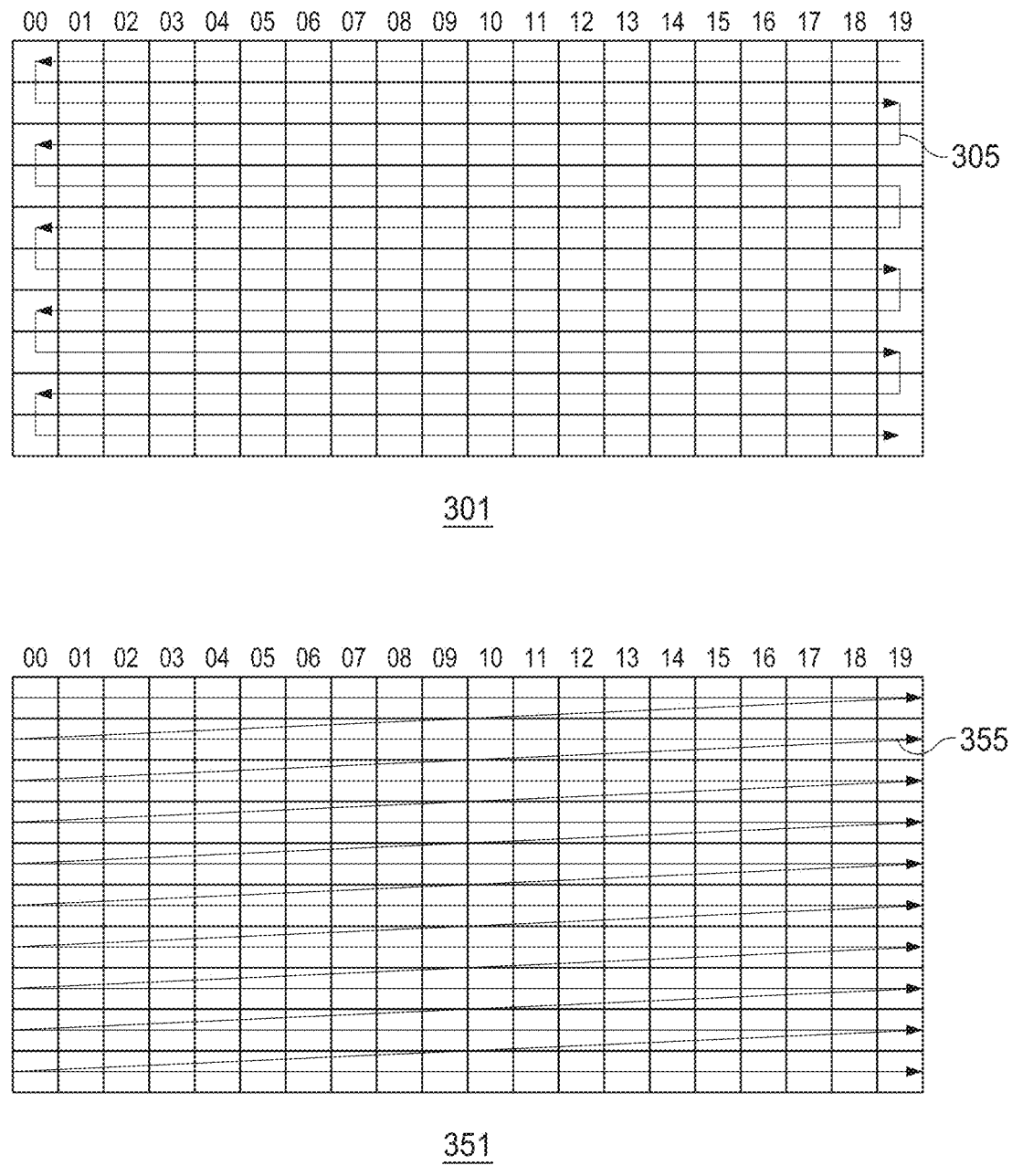

FIG. 3 depicts two alternative arrangements for displaying a simplified pixel matrix using a scanning projector in accordance with one or more embodiments. In these examples, an image may be projected by the projection system 201 by projecting each pixel of the entire image along a scan path comprising multiple locations that each ideally correspond to the location of a pixel in a typical pixel matrix comprising a fixed number of rows and columns. In various embodiments, the projection of each pixel is performed via one or more light emitters emitting one or more light beams that each have a respective intensity, such as may correspond to a color intensity value associated with a particular pixel in a Red-Green-Blue (RGB) display mode, with a scanning redirection system (e.g., one or more redirecting mirrors) rotating or otherwise redirecting the one or more light beams along a configured scan path. In the two examples of FIG. 3, each row of a pixel matrix is successively scanned and displayed prior to vertically transitioning to scan and display a successive row. It will be appreciated that any manner of scan path may be utilized in accordance with embodiments described herein. For example, scan paths may be utilized in which each column of a pixel matrix is scanned and displayed prior to horizontally transitioning to scan and display a successive column; additional examples include concentric scan paths, unidirectional or bidirectional scan paths, etc. In certain embodiments, an interlaced projection may be implemented, for example, such that the image is projected from top to bottom and then from bottom to top (e.g., in an interlaced manner).

In the first example of FIG. 3, a first pixel matrix 301 includes a 10×20 matrix arranged as 10 rows of 20 pixels each, and is depicted with an example scan path 305. In the example scan path 305, the scanning begins at the top right (column 19 of the top row) and proceeds leftward, with one or more mirrors of a scanning redirection system (e.g., scanning redirection system 215 of FIG. 2) rotating in order to effectuate the scanning and display of successive locations along the scan path. At the leftmost pixel, the scanning of the first pixel matrix 301 continues by proceeding downward to column 00 of the second row and then proceeding rightward. The example scan path 305 continues in this manner until all pixels of the first pixel matrix 301 is completed.

In the second example of FIG. 3, a second pixel matrix 351 includes an identical matrix, again arranged as 10 rows of 20 pixels each, and is depicted with an example scan path 355. In the example scan path 355, the scanning begins at the top left (column 00 of the top row) and proceeds rightward. At the rightmost pixel, the scanning of the first pixel matrix 301 continues by proceeding downward to the second row and then proceeding leftward. Notably in contrast to example scan path 305 discussed above, the example scan path 355 does not indicate that rows are scanned and displayed in alternative horizontal directions; instead, each row is scanned and displayed horizontally from left to right in turn, after which the scanning redirection system 215 returns to an original position. This example, commonly termed "raster scanning" includes a flyback period in which no image is projected.

The example scan path 355 continues in this manner until all pixels of the second pixel matrix 351 is completed.

Figure 4:
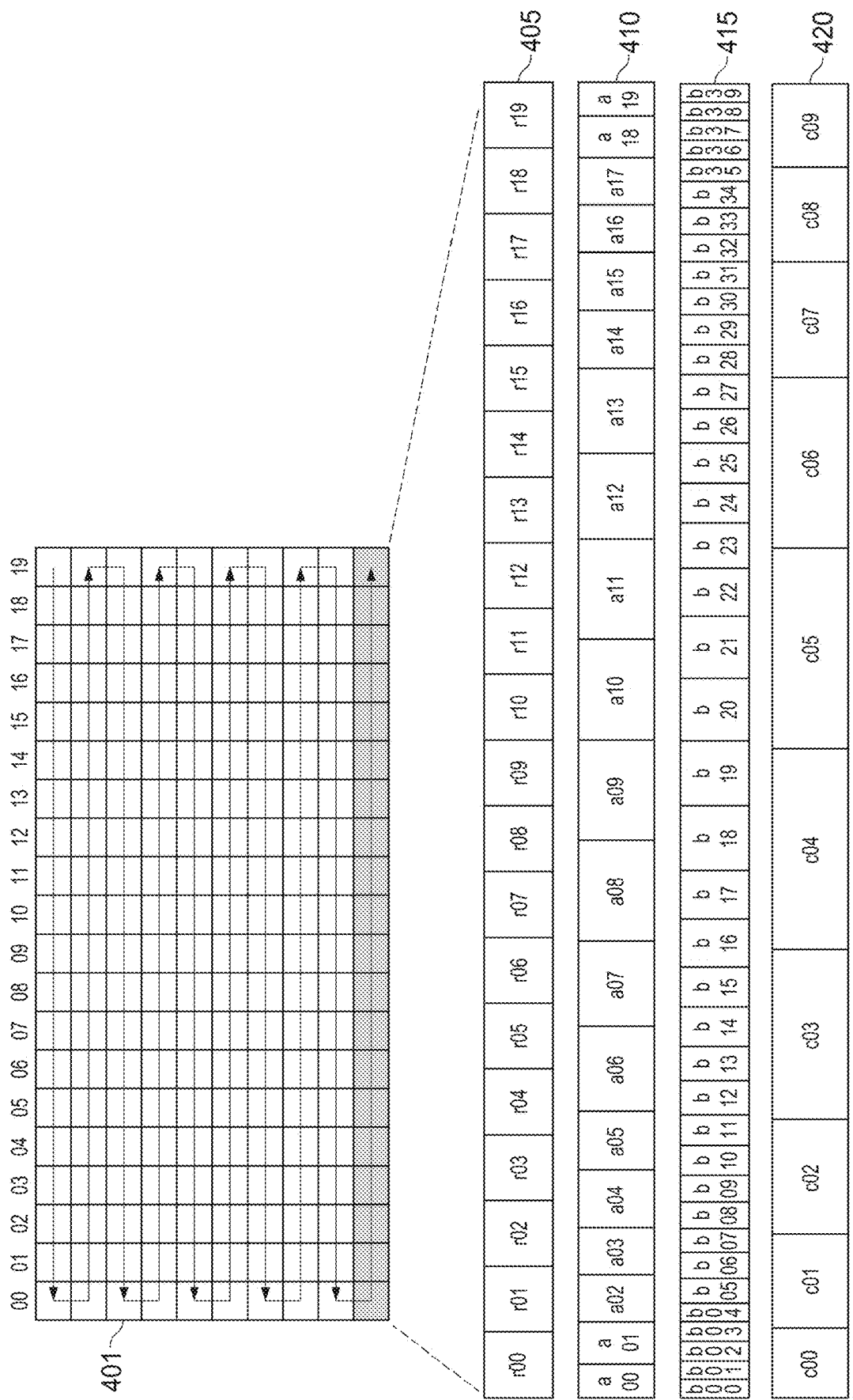
FIG. 4 illustrates a pixel matrix and various pixel positioning schema associated with the display of projected pixels associated with the pixel matrix, including in accordance with one or more embodiments.

FIG. 4 illustrates a simplified pixel matrix 401 and various pixel positioning schemes associated with the scan and display of one scan line of pixels in that pixel matrix. Typically, during the display of projected content via a scanning projector, a scan mirror accelerates from rest at the beginning of a scan line, moves faster while progressing along the middle of the scan line, and slows towards the end of the scan line in preparation for reversing direction (to either scan and display a next scan line in a reverse direction, or to return to a starting position for scanning and displaying to the next scan line in the same direction as the first, depending upon the type of scan path employed). Due to this variation in scan speed in the course of a single scan line, the width of the corresponding displayed pixel is not constant. In particular, pixels displayed near the beginning and end of the scan line—when the dynamic mirror is rotating more slowly—may have significantly less width than pixels displayed in the center region of the scan line, when the dynamic mirror is rotating more quickly.

In a rendered pixel row 405, the bottom row of pixel matrix 401 is depicted and magnified, displaying one row of twenty pixels designated as r00, r01, . . . , r19.

To illustrate the effective resolution and respective pixel widths of a projected row of pixels using a scanning projector, a first modulation frequency A is used to render projected pixels a00, a01, . . . , a19 to display example projected pixel row 410. Given the first modulation frequency and a periodic mirror speed, the projected pixel locations and widths change along the rendered pixel scan line as shown, with pixels positioned towards the center of the scan line (e.g., a08, . . . , a11) having a greater width than those positioned towards the ends (e.g., a00, a01, a18 and a19).

In order to increase an effective resolution of the displayed scan line, a second modulation frequency B is used that is greater than the first modulation frequency A, as shown in example projected pixel row 415 and its projected pixels b00, b01, . . . , b39—each of which is less wide than the corresponding pixels of the earlier example projected pixel row 410. In the depicted example, the resulting increase in effective resolution doubles the quantity of pixels rendered for each pixel row.

In contrast, example projected pixel row 420 is rendered using a third modulation frequency C that is less than the first modulation frequency A, such as in response to determining that content being displayed by the example projected pixel row is textual or other high-contrast content. In the depicted example, the lower modulation frequency C results in a correspondingly greater width for each of pixels c00, c01, . . . , c09 (compared to the corresponding pixels of the earlier example projected pixel row 410), as well as a correspondingly decreased effective resolution.

Figure 5:
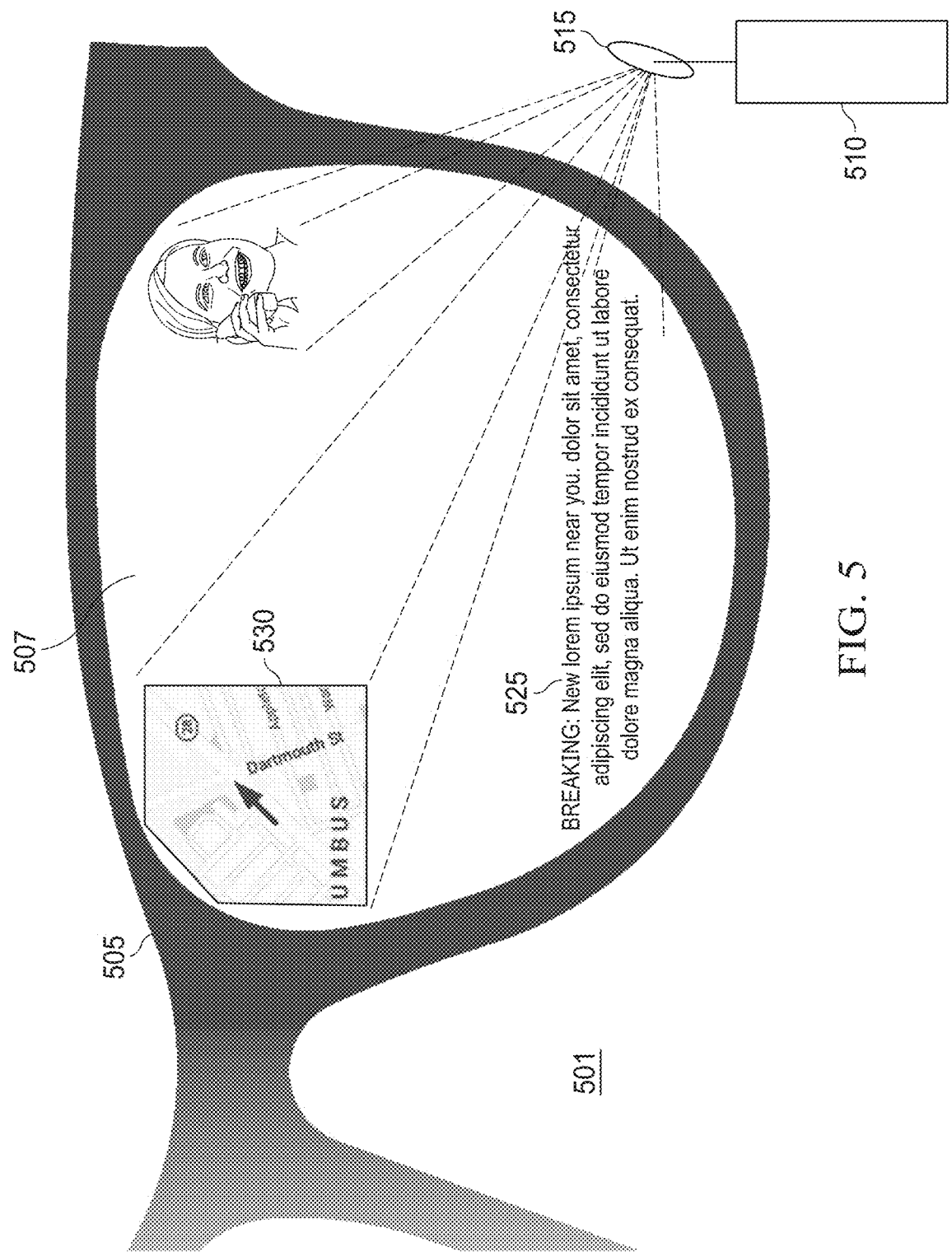
FIG. 5 depicts an example of multiple display areas on a projection surface for rendering content of different types in accordance with one or more embodiments.

FIG. 5 depicts an example of multiple display areas on a projection surface (eyeglass lens) 507 for rendering content of different types in accordance with one or more embodiments. In the depicted embodiment, an eyeglass-carried display system 501 includes a frame 505, one or more light emitters 510, and a scanning redirection system (e.g., one or more scanning mirrors) 515.

In the depicted embodiment, the display system 501 identifies three types of content included as part of content received for display on the projection surface 507. A first portion of content, received for display in a first display area 520, has a relatively low contrast ratio and is identified by the display system as having a photographic content type. A second portion of content, received for display in a second display area 525, has a relatively high contrast ratio and is identified by the display system as having a textual content type. A third portion of content, received for display in a third display area 530, has an intermediate contrast ratio and is identified by the display system as having an intermediate graphical content type.

As a result of the display system identifying a distinct content type associated with each of the three portions of content received for display, the display system selects a corresponding effective resolution in which to display each of the respective portions of content. In particular, the display system determines to render pixels of the first portion of content (the image of the woman in display area 520) at a high effective resolution, and corresponding high modulation frequency. In certain embodiments and scenarios, the effective resolution selected by the display system for the first portion of content may match an incoming effective resolution at which the content was received by the display system. In contrast, the display system determines to render pixels of the second portion of content (the textual content in display area 525) at a greatly lowered effective resolution, and correspondingly lower modulation frequency. The display system determines to render pixels of the third portion of content (the map content in display area 530) at an intermediate effective resolution, with a modulation frequency between that used for the first portion of content and the second portion of content.

In certain embodiments, the display system may store one or more predefined display area configurations that may be used to identify portions of particular content, such as if content received from an image generator corresponds to a display layout that is segmented in a manner similar to that identified in the stored display area configuration. In such embodiments, each of the predefined display area configurations may include an indication of an effective resolution (and/or corresponding modulation frequency) associated with each of multiple display areas of a projection surface. As an example, assume that a user of the display system 501 is traveling in accordance with map directions provided by a communicatively coupled processing system, which is providing the high-contrast graphical content of display area 530 along with the textual content of display area 525. The display system has identified the respective types of provided content for those display areas based on a predefined display area configuration. While the user is still traveling in this matter, an incoming call arrives, resulting in content received from the GPU now including the low-contrast graphical content specified for display via display area 520. The display system may, in certain embodiments, select another predefined display area configuration that appears to match the incoming content. In this second predefined display area configuration, the content specified for display in display area 540 is identified as having photographic content, resulting in the display system determining to render pixels of the display area 540 at a correspondingly high effective resolution and modulation frequency.

Figure 6:
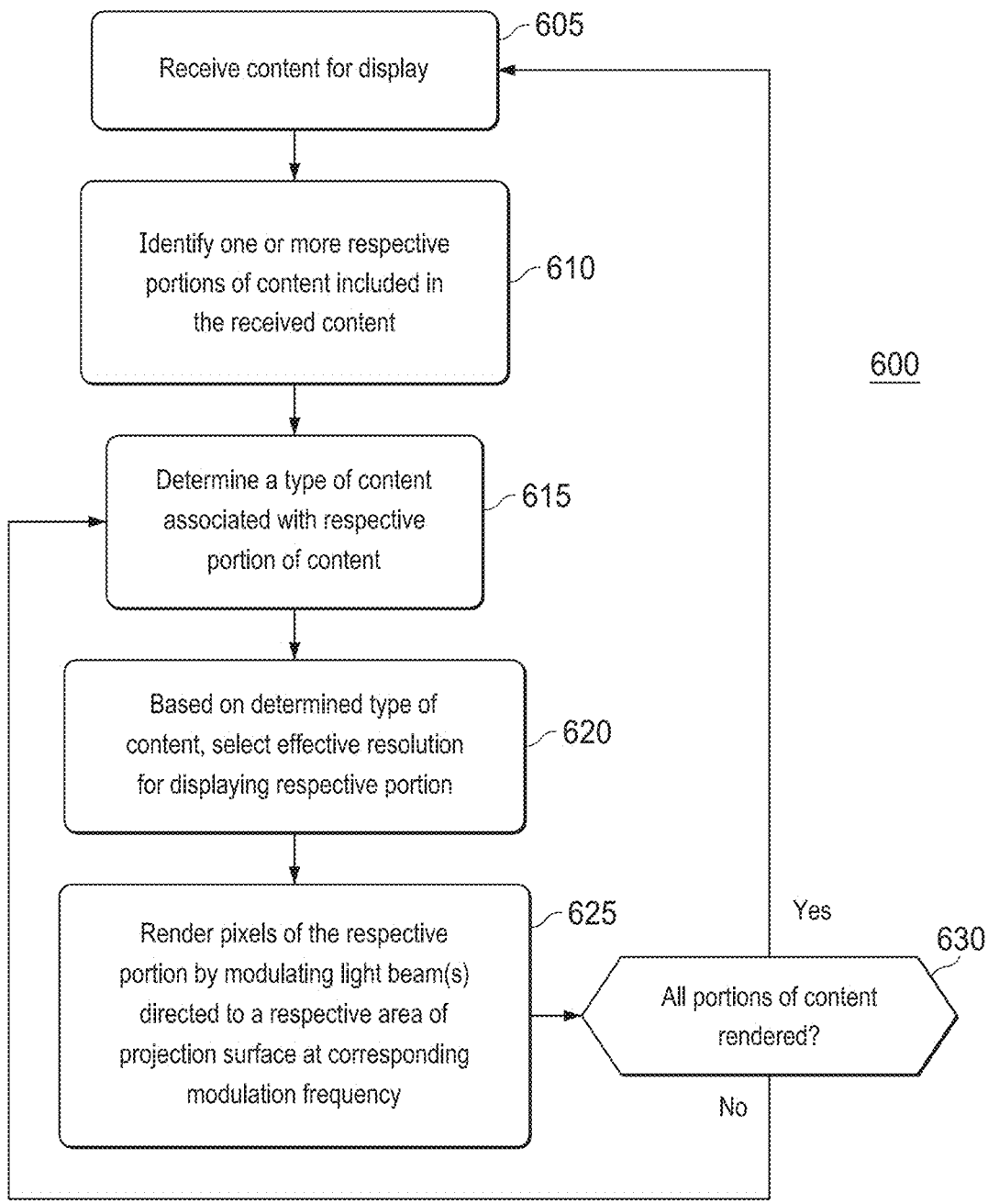
FIG. 6 is a block diagram illustrating an overview of operations of a display system in accordance with one or more embodiments.

FIG. 6 is a block diagram illustrating an overview of an operational routine 600 of a processor-based display system in accordance with one or more embodiments. The routine may be performed, for example, by an embodiment of HWD device 110 of FIG. 1, by one or more components of system 700 of FIG. 7, or by some other embodiment.

The routine begins at block 605, in which the processor-based display system receives content for display on a projection surface, such as a projection surface on one of optical elements 130 of FIG. 1, or projection surface 202 in the embodiment of FIG. 2.

The routine proceeds to block 610, in which the processor-based display system identifies one or more respective portions of content included in the received content. The routine then proceeds to block 615. In certain embodiments, the display system may identify the one or more respective portions of content based on one or more predefined display area configurations stored by the display system, such as based on an identified spatial layout of the received content.

At block 615, the processor-based display system determines a type of content associated with an identified respective portion of content. In various embodiments, the type of content associated with each respective portion may be identified in various manners. For example, a respective portion may be tagged or otherwise indicated via metadata from a GPU or other image generator indicating the type of content. As another example, a controller of the display system may identify an associated type of content based on one or more graphical characteristics of the respective portion, such as a color depth, a contrast ratio, or other graphical characteristic.

The routine proceeds to block 620, in which the processor-based display system selects, based at least in part on the identified type of content associated with the respective portion, an effective resolution for displaying the respective portion. The routine then proceeds to block 625.

Figure 7:
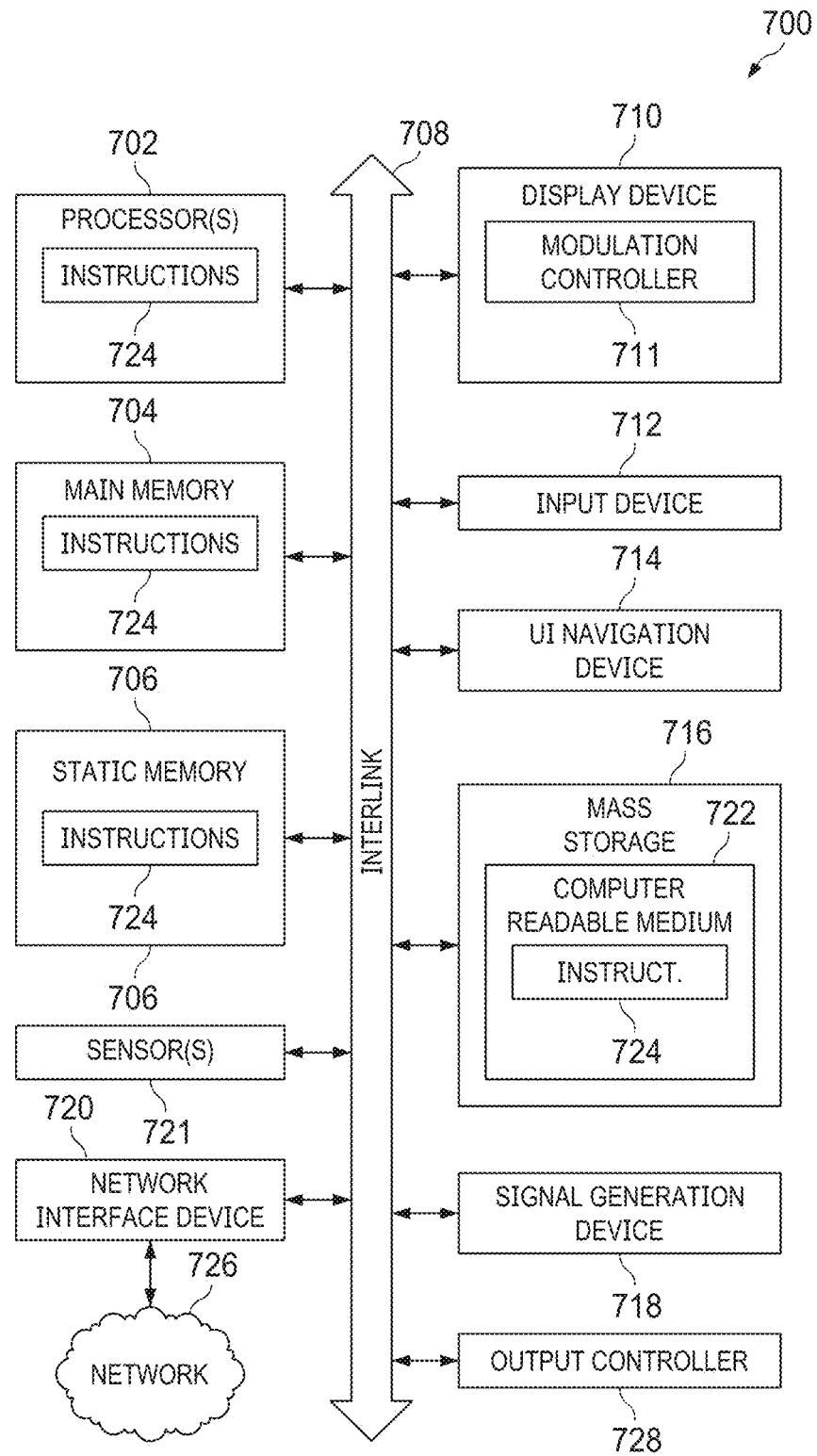
FIG. 7 is a component-level block diagram illustrating an example of a system suitable for implementing one or more embodiments.

At block 625, the processor-based display system renders pixels of the respective portion by modulating (e.g., via a modulation controller such as modulation controller 711 of FIG. 7) the intensity of each emitted light beam directed to a display area of the projection surface in accordance with a modulation frequency corresponding to the selected effective resolution for the respective portion of content. In certain embodiments, the light beams may be emitted by one or more light emitters (e.g., SLP 144 of the embodiment of FIG. 1, light emitter 205 in the embodiment of FIG. 2, and/or light emitters 510 of FIG. 5) and redirected to one or more display areas of the projection surface via a scanning redirection system (e.g., scan mirror 142 of the embodiment of FIG. 1, or scanning redirection system 215 in the embodiment of FIG. 2). As discussed in greater detail elsewhere herein, in certain embodiments and scenarios each respective portion of content may occupy a distinct display area of the projection surface.

In the depicted embodiment, the routine then proceeds to block 630, in which the processor-based display system determines whether all portions of the received content have been rendered. If not, the routine returns to block 615 to determine a type of content associated with a next respective portion of content. If it is instead determined that all portions of the received content have been rendered, the routine returns to block 605 to receive additional content for display. It will be appreciated that, in various embodiments and circumstances, successive content may comprise similar or identical content as a previous image and may not be associated with receiving "new" content data, such as if a display of the projected content is to be refreshed or updated in accordance with a specified display frequency.

FIG. 7 is a component-level block diagram illustrating an example of a system 700 suitable for implementing one or more embodiments. In alternative embodiments, the system 700 may operate as a standalone device or may be connected (e.g., networked) to other systems. In various embodiments, one or more components of the system 700 may be incorporated within a head wearable display or other wearable display to provide various types of graphical content and/or textual content. It will be appreciated that an associated HWD device may include some components of system 700, but not necessarily all of them. In a networked deployment, the system 700 may operate in the capacity of a server machine, a client machine, or both in server-client network environments. In an example, the system 700 may act as a peer system in peer-to-peer (P2P) (or other distributed) network environment. The system 700 may be a personal computer (PC), a tablet PC, a set-top box (STB), a personal digital assistant (PDA), a mobile telephone, a web appliance, a network router, switch or bridge, or any system capable of executing instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

System (e.g., a mobile or fixed computing system) 700 may include one or more hardware processors 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The system 700 may further include a display unit 710 (such as a scanning projector system) comprising a modulation controller 711, an alphanumeric input device 712 (e.g., a keyboard or other physical or touch-based actuators), and a user interface (UI) navigation device 714 (e.g., a mouse or other pointing device, such as a touch-based interface). In one example, the display unit 710, input device 712, and UI navigation device 714 may comprise a touch screen display. The system 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The system 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a computer readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the system 700. In an example, one or any combination of the hardware processor 702, the main memory 704, the static memory 706, or the storage device 716 may constitute computer readable media.

While the computer readable medium 722 is illustrated as a single medium, the term "computer readable medium" may include a single medium or multiple media (e.g., a centralized or distributed database, and/or associated caches and servers) configured to store the one or more instructions 724.

The term "computer readable medium" may include any medium that is capable of storing, encoding, or carrying instructions for execution by the system 700 and that cause the system 700 to perform any one or more of the techniques of the present disclosure, or that is capable of storing, encoding or carrying data structures used by or associated with such instructions. Non-limiting computer readable medium examples may include solid-state memories, and optical and magnetic media. In an example, a massed computer readable medium comprises a computer readable medium with a plurality of particles having invariant (e.g., rest) mass. Accordingly, massed computer readable media are not transitory propagating signals. Specific examples of massed computer readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SI MO), multiple-input multiple-output (MIMO), or multiple-input single-output (MISO) techniques. The term "transmission medium" shall be taken to include any intangible medium that is capable of storing, encoding or carrying instructions for execution by the system 700, and includes digital or analog communications signals or other intangible medium to facilitate communication of such software.

In one example embodiment, a method for displaying an image may include receiving a first portion of content for display; identifying a type of content associated with the first portion; selecting, based at least in part on the identified type of content, a first emitter modulation frequency; and rendering pixels of the first portion of content at a first effective resolution by modulating one or more light beams directed to a first display area of a projection surface at the first emitter modulation frequency.

Modulating the one or more light beams at the first emitter modulation frequency may include modifying an intensity of at least one of the one or more light beams at the first emitter modulation frequency.

The method may further include rendering pixels of a distinct second portion of content by modulating the one or more light beams at a distinct second emitter modulation frequency while the one or more light beams are directed to a second display area of the projection surface. The method may still further include receiving the second portion of content for display; evaluating the second portion to determine a distinct second type of content associated with the second portion; and selecting, based at least in part on the second type of content, the distinct second emitter modulation frequency.

The method may further include storing multiple defined display area configurations, such that each of the defined display area configurations indicates one or more display areas of the projection surface that are each associated with one or more of an effective resolution and a specified modulation frequency. Identifying the type of content associated with the first portion may include selecting one of the multiple defined display area configurations.

Identifying the type of content associated with the first portion may include identifying the type of content based on one or more graphical characteristics of the first portion. The one or more graphical characteristics of the first portion may include one or more of a contrast ratio of the first portion and a color depth of the first portion.

The projection surface may be part of an optical element that includes at least a portion of one or more eyeglass lenses.

In another example embodiment, a display system may comprise an interface to receive content for display by the display system; a processor to identify one or more types of content associated with one or more portions of content in the received content, and to select, for each respective portion of the one or more portions of content and based at least in part on the identified content type for the respective portion, an effective resolution for displaying the respective portion; and a modulation controller to modulate, for each respective portion of the one or more portions of content, one or more light beams directed to a respective display area of a projection surface at a respective emitter modulation frequency that corresponds to the selected effective resolution for the respective portion.

To modulate the one or more light beams may include to modify an intensity of at least one of the one or more light beams at the respective emitter modulation frequency.

To identify the one or more types of content may include to identify one of multiple stored display area configurations associated with the received content, such that each of the stored display area configurations indicates one or more display areas of the projection surface that are each associated with one or more of an effective resolution and a specified modulation frequency.

To identify the one or more types of content may include to identify that a first respective portion of content includes textual content and to identify that a second respective portion of content includes graphical content. To select an effective resolution for displaying the first respective portion of content may include to select a first respective effective resolution that is less than a second respective effective resolution for the second respective portion of content.

To identify the type of content associated with at least one portion of the one or more portions of content may include to identify the type of content based on one or more graphical characteristics of the at least one portion.

To identify the type of content associated with at least one portion of the one or more portions of content may include to identify the type of content based on metadata included in the received content.

The projection surface may be part of an optical element that includes at least a portion of one or more eyeglass lenses.

In another example embodiment, a head wearable display (HWD) device may comprise an optical element; a processor to identify one or more types of content associated with one or more portions of content for display, and to select, for each respective portion of the one or more portions of content and based at least in part on the identified content type for the respective portion, an effective resolution for displaying the respective portion; at least one light emitter to emit one or more light beams; a scanning redirector to redirect the one or more emitted light beams to one or more display regions on a projection surface of the optical element; and a modulation controller to modulate, for each respective portion of the one or more portions of content, one or more light beams directed to a respective display area of a projection surface at a respective emitter modulation frequency that corresponds to the selected effective resolution for the respective portion.

To modulate the one or more light beams may include to modify an intensity of at least one of the one or more light beams at the respective emitter modulation frequency.

To identify the one or more types of content may include to identify one of multiple stored display area configurations associated with the received content, such that each of the stored display area configurations indicates one or more display areas of the projection surface that are each associated with one or more of an effective resolution and a specified modulation frequency.

To identify the one or more types of content may include to identify that a first respective portion of content includes textual content and to identify that a second respective portion of content includes graphical content. To select an effective resolution for displaying the first respective portion of content may include to select a first respective effective resolution that is less than a second respective effective resolution for the second respective portion of content.

To identify the type of content associated with at least one portion of the one or more portions of content may include to identify the type of content based on one or more graphical characteristics of the at least one portion.

To identify the type of content associated with at least one portion of the one or more portions of content may include to identify the type of content based on metadata included in the received content.

The optical element may comprise at least a portion of one or more eyeglass lenses.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for displaying an image, the method comprising:
    receiving content for display;
    identifying in the received content multiple types of content respectively associated with multiple portions of the received content;
    selecting, for at least some portions of the multiple portions of content and based at least in part on a respective identified type of content, a respective emitter modulation frequency, wherein selecting the respective emitter modulation frequency comprises selecting a first effective resolution for displaying a first textual portion of content that is less than a second effective resolution for displaying a second graphical portion of content; and
    rendering pixels of the multiple portions of content at the selected respective effective resolution by modulating one or more light beams directed to a corresponding display area of a projection surface at the selected respective emitter modulation frequency.

2. The method of claim 1, wherein, for at least one portion of content, modulating the one or more light beams at the selected emitter modulation frequency includes modifying an intensity of at least one of the one or more light beams at the selected emitter modulation frequency.

3. The method of claim 1, comprising:
    receiving the second graphical portion of content for display;
    evaluating the second graphical portion to determine a distinct type of graphical content associated with the second portion; and
    selecting, based at least in part on the distinct type of graphical content, the respective emitter modulation frequency for the second graphical portion of content.

4. The method of claim 1, further comprising storing multiple defined display area configurations, each of the defined display area configurations indicating one or more display areas of the projection surface that are each associated with one or more of an effective resolution and a specified modulation frequency.

5. The method of claim 4, wherein identifying the type of content associated with a respective portion includes selecting one of the multiple defined display area configurations.

6. The method of claim 1, wherein identifying the type of content associated with at least one portion of content includes identifying the type of content based on one or more graphical characteristics of the at least one portion.

7. The method of claim 6, wherein the one or more graphical characteristics of the at least one portion include one or more of a contrast ratio of the at least one portion and a color depth of the at least one portion.

8. The method of claim 1, wherein the projection surface is part of an optical element that includes at least a portion of one or more eyeglass lenses.

9. A display system, comprising:
    an interface to receive content for display by the display system;
    a processor to identify in the received content multiple types of content that are respectively associated with multiple portions of the received content, and to select, for each respective portion of content and based at least in part on the identified content type for the respective portion, an effective resolution for displaying the respective portion, wherein to select an effective resolution for displaying a first textual portion of content comprises selecting a first effective resolution that is less than a second effective resolution that is selected for displaying a second graphical portion of content; and
    a modulation controller to modulate, for each respective portion of the one or more portions of content, one or more light beams directed to a respective display area of a projection surface at a respective emitter modulation frequency that corresponds to the selected effective resolution for the respective portion.

10. The display system of claim 9, wherein to modulate the one or more light beams includes to modify an intensity of at least one of the one or more light beams at the respective emitter modulation frequency.

11. The display system of claim 9, wherein to identify the multiple types of content includes to identify one of multiple stored display area configurations associated with the received content, each of the stored display area configurations indicating one or more display areas of the projection surface that are each associated with one or more of an effective resolution and a specified modulation frequency.

12. The display system of claim 9, wherein to identify the multiple types of content includes to identify that the first portion of content includes textual content and to identify that the second portion of content includes graphical content.

13. The display system of claim 9, wherein to identify the type of content associated with at least one portion of the multiple portions of content includes to identify the type of content based on one or more graphical characteristics of the at least one portion.

14. The display system of claim 9, wherein to identify the type of content associated with at least one portion of the multiple portions of content includes to identify the type of content based on metadata included in the received content.

15. The display system of claim 9, wherein the projection surface is part of an optical element that includes at least a portion of one or more eyeglass lenses.

16. A head wearable display (HWD) device, comprising:
    an optical element;

a processor to identify one or more types of content associated with one or more portions of content for display, and to select, for each respective portion of the one or more portions of content and based at least in part on the identified content type for the respective portion, an effective resolution for displaying the respective portion;

at least one light emitter to emit one or more light beams;

a scanning redirector to redirect the one or more emitted light beams to one or more display regions on a projection surface of the optical element; and a modulation controller to modulate, for each respective portion of the one or more portions of content, one or more light beams directed to a respective display area of a projection surface at a respective emitter modulation frequency that corresponds to the selected effective resolution for the respective portion;

wherein to identify the one or more types of content includes to identify that a first respective portion of content includes textual content and to identify that a second respective portion of content includes graphical content, and wherein to select an effective resolution for displaying the first respective portion of content includes to select a first respective effective resolution that is less than a second respective effective resolution for the second respective portion of content.

17. The HWD device of claim 16, wherein to modulate the one or more light beams includes to modify an intensity of at least one of the one or more light beams at the respective emitter modulation frequency.

18. The HWD device of claim 16, wherein to identify the one or more types of content includes to identify one of multiple stored display area configurations associated with the content, each of the stored display area configurations indicating one or more display areas of the projection surface that are each associated with one or more of an effective resolution and a specified modulation frequency.

19. The HWD device of claim 16, wherein to identify the type of content associated with at least one portion of the one or more portions of content includes to identify the type of content based on one or more graphical characteristics of the at least one portion.

20. The HWD device of claim 16, wherein to identify the type of content associated with at least one portion of the one or more portions of content includes to identify the type of content based on metadata included in the content.

21. The HWD device of claim 16, wherein the optical element comprises at least a portion of one or more eyeglass lenses.

* * * * *